United States Patent [19]
Ueda et al.

[11] 3,987,460
[45] Oct. 19, 1976

[54] AUTOMATIC DIAPHRAGM APERTURE CONTROL

[75] Inventors: Hiroshi Ueda, Nara; Motonobu Matsuda, Izumi, both of Japan

[73] Assignee: Minolta Camera Kabushiki Kaisha, Japan

[22] Filed: July 11, 1975

[21] Appl. No.: 595,063

[30] Foreign Application Priority Data
July 11, 1974 Japan.................................. 49-78731

[52] U.S. Cl................................ 354/43; 354/60 R
[51] Int. Cl.².......................................... G03B 7/08
[58] Field of Search.................... 354/42, 43, 60 R

[56] References Cited
UNITED STATES PATENTS

| | | | |
|---|---|---|---|
| 3,777,637 | 12/1973 | Kuromoto et al. | 354/42 |
| 3,818,494 | 6/1974 | Tonikoshi et al. | 354/43 X |
| 3,833,913 | 9/1974 | Wick et al. | 354/42 |
| 3,889,277 | 6/1975 | Ogiso et al. | 354/43 X |

*Primary Examiner*—Joseph F. Peters, Jr.
*Attorney, Agent, or Firm*—Watson, Cole, Grindle & Watson

[57] ABSTRACT

An automatic diaphragm aperture control device for use in a camera for controlling the setting of the diaphragm with a high degree of accuracy. The diaphragm is adapted to be stopped down in association with the releasing operation of a shutter. During this stop down operation, the output of a light measuring circuit of the camera measures the light from a photographic image, which has passed through an objective lens and a diaphragm aperture. The output of the light measuring circuit is then compared with the output of an output circuit which corresponds to a pre-selected shutter speed. When the difference between the two outputs reaches a given level, the operation of an electromagnet is reversed so as to thereby cause the locking of the diaphragm and stopping its stopping-down operation. In this control device, a voltage proportional to a differentiated value of the output of the light measuring circuit with respect to time is produced by a differentiating circuit and is added to the difference between the two outputs, for assisting in the control of the diaphragm aperture.

4 Claims, 9 Drawing Figures

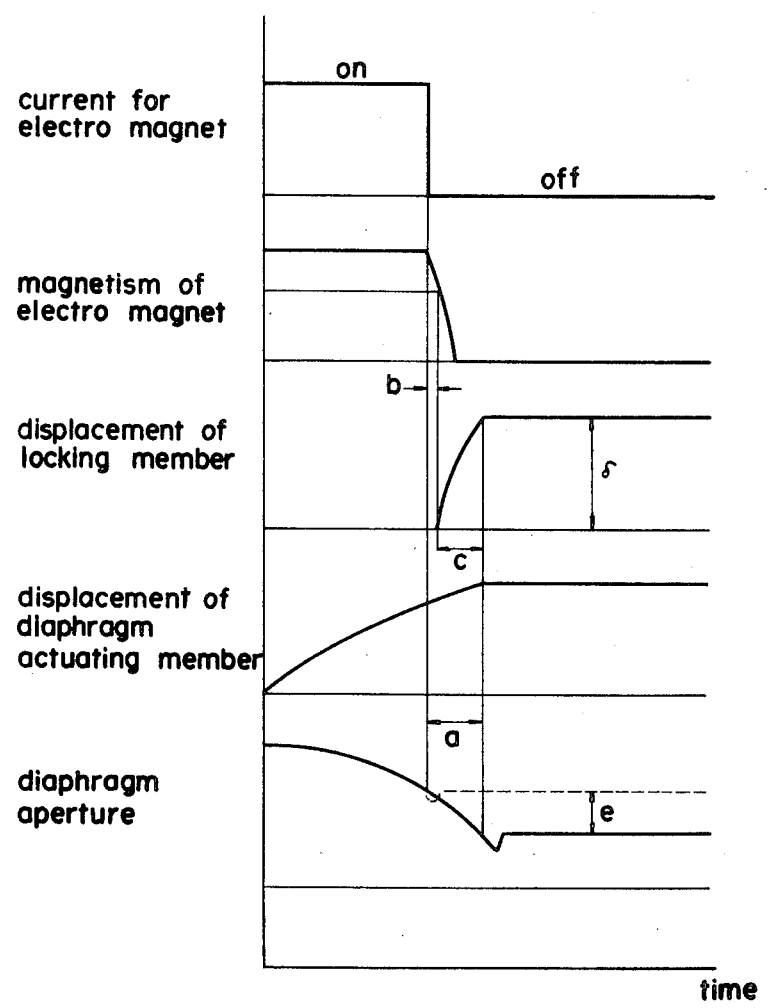

AUTOMATIC DIAPHRAGM APERTURE CONTROL

BACKGROUND OF THE PRESENT INVENTION

The present invention relates to an automatic diaphragm aperture control device for use in a camera.

More particularly, the present invention relates to improvements in an automatic diaphragm aperture control device which controls the diaphragm aperture with a high accuracy so as to provide an optimum exposure with respect to the brightness of an objective image and a pre-selected shutter speed.

An exposure control device is already known which automatically controls a diaphragm aperture so as to provide an optimum exposure with respect to the measured brightness of an objective image and the pre-selected shutter speed. This operation will be referred to hereinafter as "auto-stopping down opertion". There is also known an exposure control device which automatically controls the shutter speed so as to provide an optimum exposure with respect to a setting of the diaphragm aperture which has been selected beforehand, where the control of the shutter speed is made in dependence upon a measurement of the brightness of an objective image.

U.S. Pat. No. 3,777,637 discloses an example of such an auto-stopping down device. In the device disclosed by this patent, the light from an objective image which has passed through the objective lens and the aperture of the diaphragm is measured, with the diaphragm being stopped down from its open position, before the exposure operation is started, in association with the releasing operation of the shutter. When an output signal indicative of the light measurement reaches an optimum value relative to the preselected shutter speed, the diaphragm is locked so as to stop its stopping down operation. This operation thereby controls the setting of the diaphragm aperture.

In utilizing the above-described auto-stopping down operation, the advantage is achieved that a known exchangeable lens which is available in the market may be used intact in conjunction with the auto-stopping down operation. In this operation, upon control of the diaphragm aperture by locking the diaphragm so as to stop its stopping down operation, an actuating signal is generated at the time when the diaphragm aperture provides an optimum exposure relative to the pre-selected shutter speed. Upon receipt of this actuating signal the diaphragm is locked by means of a locking mechanism, which was previously in a retracted position from the stopping down mechanism. This operation, however, results in the disadvantage of the occurrence of a time delay due to the movement of the locking mechanism and the operations of the other mechanical members. This time delay causes the diaphragm to be actually stopped down to an additional extent as compared with the diaphragm aperture setting which would provide an optimum exposure.

SUMMARY OF THE PRESENT INVENTION

It is an object of the present invention to provide an automatic diaphragm aperture control device of the previously described type, which overcomes the disadvantage of the previously known device.

It is another object of the present invention to provide an automatic diaphragm aperture control device for use in a camera, which, during the auto-stopping down operation, controls the diaphragm aperture so as to provide an optimum exposure with a high degree of accuracy, with respect to the brightness of an objective image and the pre-selected shutter speed.

It is a further object of the present invention to provide an automatic diaphragm aperture control device for use in a camera, which, during the auto-stopping down operation, controls the diaphragm aperture so as to provide an optimum exposure with a high degree of accuracy, with respect to the pre-selected shutter speed, by using an exchangeable lens readily available in the market without the necessity for any modification.

It is still another object of the present invention to provide an automatic diaphragm aperture control device for use in a camera, in which during the auto-stopping down operation, the time delay caused by the delay in the mechanical operation of the locking mechanism is compensated for by providing the signal for actuating the operation of the locking mechanism at a certain time earlier, which corresponds to the above-noted time delay, so as to thereby ensure that the diaphragm aperture is only stopped down to the extent necessary for proper exposure.

In order to accomplish these objectives, according to the present invention, there is provided an automatic diaphragm aperture control device for use in a camera, in which there is provided a stopping down mechanism adapted to stop down the diaphragm from its open position to its minimum diaphragm aperture, prior to the commencement of exposure in association with the shutter releasing operation. More particularly, upon actuation of the auto-stopping down operation, an adjusting ring adapted to adjust the diaphragm is initially adjusted so as to provide the minimum diaphragm aperture, while a locking mechanism locks the diaphragm so as to stop the stopping down operation during the operation of the stopping down mechanism.

The automatic diaphragm aperture control device, according to the present invention, is provided with a light measuring circuit adapted to measure the light from an objective image, which has passed through the objective lens and the aperture of the diaphragm. The light measuring circuit provides an output which is reduced with the progress of time as the diaphragm is being stopped down by the stopping down mechanism. The control device is also provided with a differentiating circuit adapted to differentiate the output of the light measuring circuit. There is further provided in the control device, an output circuit adapted to provide an output which corresponds to the pre-selected shutter speed. A control circuit of the control device is provided with an input obtained by adding the difference between the output of the light measuring circuit and the output of the output circuit, together with the output of the differentiating circuit. If this input to the control circuit reaches a given level, then a control signal is generated and fed to the locking mechanism for actuating such mechanism. For this reason, the control circuit should preferably be a differential amplifying circuit having two inputs terminals, one of which is adapted to receive the sum of the output of the light measuring circuit and the output of the differentiating circuit, and the other of which is adapted to receive the output of the output circuit. The control signal of the control circuit starts the locking operation of the locking member for stopping the stop down operation of the diaphragm aperture.

The addition of the output of the light measuring circuit to the difference between the output of the output circuit and the output of the differentiating circuit means that an output component commensurate to the variation in the output of the light measuring circuit is added to the difference between the output of the light measuring circuit and that of the output circuit.

There is incurred a time delay from the time when the locking operation of the locking member is actuated in response to the control signal of the control circuit until the diaphragm is actually locked so as to stop its stopping down operation. This time delay remains constant for whatever value the diaphragm aperture is maintained at. Hence, the occurrence of an error in the diaphragm aperture being controlled, during such a time delay, is inevitable.

This error may be reduced to a tolerable extent by minimizing the displacement of a diaphragm actuating pin adapted to stop down the diaphragm under the control of the stopping down mechanism. This results, however, in an excessively long time from the commencement of the stopping down operation in association with the shutter releasing operation until the control of the diaphragm aperture is completed and thereafter the exposure is commenced. Such an extended period for the required operation would in turn bring about many disadvantages when photographing a moving object, and, therefore, it is impractical to adopt such a system.

Furthermore the error in the diaphragm aperture incurred during such a time delay does not remain constant, with respect to the size of the aperture, to which the diaphragm is stopped down. Stated otherwise, the stopping down of the diaphragm is non-linear since the rate of movement of an object is accelerated when a constant external force is being applied. In other words, the movement of the stopping down mechanism is slow to start and becomes faster with the progress of the movement. In addition, since an exchangeable lens available in the market is not designed so as to meet the auto-stopping down operation, the displacement of the diaphragm acutating pin which follows the stopping down mechanism does not vary linearly with respect to the variation in the diaphragm aperture, as shown in FIG. 3. Thus, in the case where the diaphragm aperture is at a fully opened position, there occurs a large displacement of the diaphragm actuating pin for stopping down the diaphragm by one stage. As the diaphragm is being stopped down, however, the displacement of the diaphragm actuating pin required for stopping down the diaphragm an additional stage is reduced. As a result, while the stopping down movement of the diaphragm starts at a relatively slow rate, it becomes faster with the progress of the stopping down movement.

Consequently, it follows that the size of the error incurred during the time delay is proportional to the size of the aperture to which the diaphragm is stopped down during such a time delay, and thus the extent does not remain constant throughout the operation.

The fact that the output of the differentiating circuit is added to the difference between the output of the light measuring circuit and the output of the output circuit and the resulting signal is fed to the control circuit signifies that an output component commensurate with the variation in extent of the stopping down operation is added to the difference between the outputs of both the light measuring and output circuits, so that the error in the diaphragm aperture, which is incurred due to the time delay of the locking member, may be corrected. Thus, at whatever diaphragm aperture size the locking member is operated, the input of the control circuit controls when the locking member locks the diaphragm so as to stop its stopping down operation, thereby providing an optimum diaphragm aperture size.

BRIEF DESCRIPTION OF THE DRAWINGS

FIG. 2 is a time chart representing the various conditions from the time when the releasing operation is effected in the embodiment of FIG. 1 until the diaphragm aperture is controlled.

DESCRIPTION OF THE PREFERRED EMBODIMENTS

Figure 1:
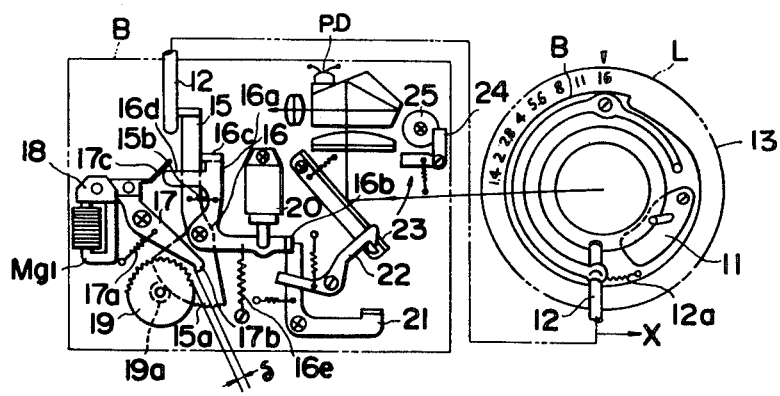
FIG. 1 is a schematic side view of the essential parts of a camera body according to one embodiment of the present invention and a front view of an objective lens, with both views being provided in side-by-side relationship.

In FIG. 1, there is shown an arrangement of the essential parts of a camera embodying the present invention. When an exchangeable lens L is mounted on a camera body B, then a diaphragm actuating pin 12 adapted to drive a diaphragm blade 11 in exchangeable lens L engages a diaphragm control lever 15 which is rotatably supported within camera body B. While diaphragm actuating pin 12 is provided by a spring 12a with a tendency for being stopping down, the pin is initially prevented from such movement by diaphragm control lever 15 which is maintained in the charged condition prior to the shutter releasing operation, so that diaphragm blade 11 is maintained in its open position. Thus, a preset ring 13 for exchangeable lens L sets the minimum diaphragm aperture for blade 11 (for example, f16 is shown).

On the other hand, camera body B is provided with a stop down drive lever 16, whose arm 16b is released from its locked condition by a release lever 21 in association with the shutter releasing operation. Drive lever 16 rotates in the clockwise direction about a shaft 16a due to the influence of a drive spring 16e which has been cocked in conjunction with the shutter releasing operation, with its rotational speed being controlled by a damper 20. Diaphragm control lever 15 is rotatably supported on shaft 16a and coupled to drive lever 16 through a connecting spring 15b. Thus, diaphragm control lever 15 rotates in the clockwise direction together with drive lever 16, while engaging a contacting piece 16c of drive lever 16. As a result, spring 12a causes diaphragm actuating pin 12 to follow the movement of control lever 15 so as to stop down the diaphragm from its open position.

Figure 4:
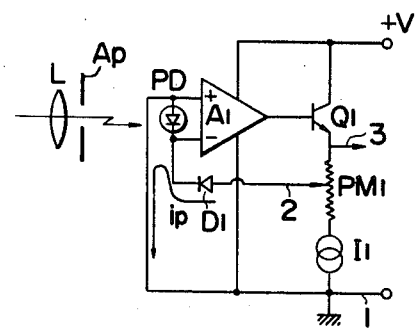
FIG. 4 is a schematic circuit diagram showing the light measuring circuit of the embodiment of FIG. 1.

During the above-described stopping down operation, a photodiode in the light measuring circuit as shown in FIG. 4, measures the light which has passed through an objective lens and the aperture of the diaphragm, which is being stopped down. When the diaphragm has been stopped down to an aperture size which provides an optimum exposure with respect to the brightness of the objective image and the preselected shutter speed, the excitation of an electromagnet Mgl of the locking mechanism is interrupted. Upon interruption of the electromagnet, a locking lever 17 having an armature 18, as shown in FIG. 1, rotates in the clockwise direction under the action of a spring 17a, so that a ratchet wheel 19 is locked by a locking pawl 17b thereby stopping its rotation. Ratchet wheel 19 is a gear which is supported in coaxial relationship with a small gear 19a which meshes with a sector-shaped gear 15a and increases the rotating speed of diaphragm control lever 15.

Accordingly, the locking of ratchet wheel 19 by means of locking pawl 17b interrupts the stopping down operation of diaphragm control lever 15 so as to thereby set the diaphragm aperture to the desired size. Even after this locking operation has been accomplished, drive lever 17 continues to rotate, so that arm 16b engages a mirror locking lever 22 to thereby release the locked condition of a mirror 23. Mirror 23, which has been released from its locked condition, rotates in the direction shown by the arrow in FIG. 1 so as to release a forward curtain shaft 25 of a focal plane shutter from its condition where it is locked by a locking lever 24, which thereby in turn actuates the shutter.

Drive lever 16 is returned to its cocked position according to the cocking operation of a subsequent photographing operation, although the camera elements for accomplishing such a cocking operation are not shown since such elements are conventionally known. With the cocking operation, the diaphragm is brought into its open position, while drive lever 16 is arrested in its cocked position by means of release lever 21. A projection 16d of drive lever 16 engages an elastic piece 17c of locking lever 17 so as to rotate locking lever 17 in the counterclockwise direction against the action of spring 17a. As it rotates in the counterclockwise direction, locking lever 17 retracts its locking pawl 17b from engagement with ratchet wheel 19 thereby causing armature 18 to again come into abutment with electromagnet Mgl.

A time chart is shown in FIG. 2 which illustrates the previously described stop down operation in detail. When the exciting current in the control circuit including the light measuring circuit is changed from its on-condition to its off-condition, the variation in the electromagnetic force of electromagnet Mgl exhibits a transient phenomenon, as is well known, thus causing a very short time delay $b$, after which the operation of locking lever 17 is commenced. Yet, the rotation of locking lever 17 through an angle $\delta$, as shown in FIG. 1, necessitates another short time $c$, after which ratchet wheel 19 is locked so as to stop the rotation of diaphragm control lever 15, and in turn interrupting the movement of diaphragm actuating pin 12 of lens L. As a result, there arises a time delay of $b + c = a$, between the operation of the control circuit until the desired diaphragm aperture is set. This then brings about an error $e$ in the size of the diaphragm aperture.

As a matter of fact, the delay time $a$ is on the order of from 1 to 2 miliseconds, and is dependent on electromagnet MG1, the control circuit, the strength of spring 17a of the locking lever, angle $\delta$ shown in FIG. 1 and the other inter-related elements. In this respect, the time delay $a$ remains constant.

On the other hand, the variation of the light measuring output during the stopping down operation is not constant with respect to the time. In other words, the curve of the light measuring outputs corresponds to the curve of the variation in the diaphragm aperture size and thus follows the lowermost curve in FIG. 2, which curve is not linear.

Figure 3:
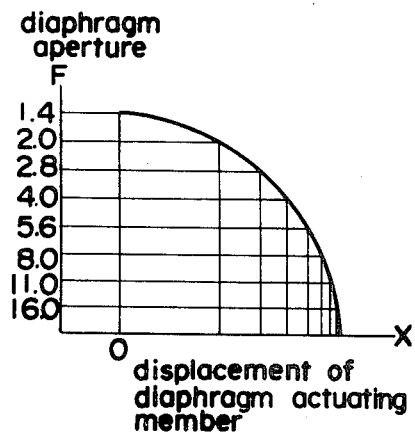
FIG. 3 is a plot representing the relationship between the variation in a diaphragm aperture in a stopping down mechanism and the displacement of a diaphragm actuating pin.

The non-linearity of this curve results from several factors, the first being that with an exchangeable lens readily available in the market, the lens is not designed as a lens for a diaphragm electric eye, so that as shown in FIG. 3 the displacement of the diaphragm actuating pin 12 does not maintain linearity relative to the variation in diaphragm aperture values. Stated differently, with such exchangeable lens, there is a large displacement of diaphragm actuating pin 12, when the stopping down of the diaphragm by one stage is required, in the neighborhood of the fully opened position of the diaphragm, while there is only a small displacement of diaphragm actuating pin 12 in the neighborhood of the minimum diaphragm aperture. The second factor is that the rate of movement of an object is accelerated with the progress of its movement, when a constant force is applied, so that the stopping down operation is relatively slow at its beginning and becomes faster with the progress of the operation.

The diaphragm aperture control device according to the present invention enables the diaphragm to be controlled with a high degree of accuracy, even in the case where the output of the light measuring circuit varies non-linearly with respect to the time after the commencement of the stopping down operation. For this purpose, the present invention provides an automatic diaphragm control device, in which a voltage of a level proportional to the variation, in terms of time, of the light measuring output is added to the light measuring output itself, and then the sum voltage thus obtained is fed into the diaphragm control device.

This operation will be described in more detail in conjunction with the accompanying drawings. In FIG. 4, there is shown a portion of the light measuring circuit, in which a light measuring voltage proportional to the logarithm of the brightness of the light from an objective image, which light has passed through objective lens L and diaphragm aperture Ap and has been incident on a photo-diode PD, appears across the terminals 1, 2 and 1, 3.

A differential amplifying circuit A1 has two input terminals to which are connected the opposite ends of photo-diode PD. The output terminal of differential amplifying circuit A1 is connected to the base of a transistor Q1, while the emitter of transistor Q1 is connected to a series circuit of a potentiometer PM1 and a constant current circuit 11. A sliding terminal 2 of potentiometer PM1 is connected to one of the input terminals of differential amplifying circuit A1 by way of a logarithmically converting diode D1 for negative feedback. Sliding terminal 2 of potentiometer PM1 is adapted to slide in response to the setting of film sensitivity.

In the operation of these circuits, when light is incident on photo-diode PD thereby generating an electromotive force in the photo-diode, then the voltage across both of the terminals of photodiode PD is almost nulified by the negative feedback circuit of differential amplifying circuit A1, while a photo-current $ip$ which is proportional to the brightness of the incident light flows through diode D1. As a result, a voltage proportional to the logarithmic value of current $ip$, i.e., a voltage proportional to the logarithm of the brightness of the incident light appears across both terminals of diode D1. Since there is no potential difference across both terminals of photo-diode PD, there appears across the terminals 1 and 2 a voltage which has been logarithmically compressed. Since a constant current flows through potentiometer PM1 through constant current circuit 11, there appears across the terminals 1 and 3 a voltage which is higher than a voltage across the terminals 1 and 2 by a level corresponding to the potential difference between the terminals 2 and 3. Meanwhile, the constant current flowing through potentiometer PM1 is set so as to be sufficiently large as compared with photo-current $ip$.

Figure 5:
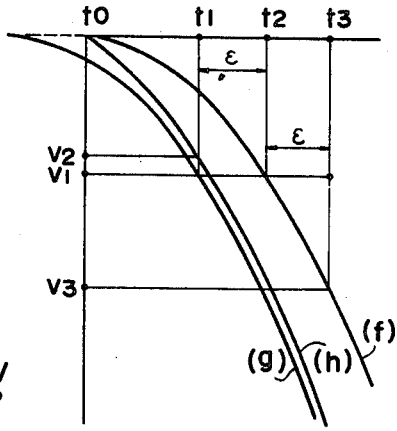
FIG. 5 is a plot showing the output characteristic curve of the light measuring circuit and the characteristic curve as corrected.

Curve $(f)$ of FIG. 5 represents the output characteristic of the light measuring circuit, in the case where the diaphragm is stopped down from its maximum aperture to its minimum aperture by using the above-described light measuring circuit. It may be safe to consider that curve $(f)$, as shown in FIG. 5, approximates a parabola characteristic which is proportional to the square of time. The ordinate of the graph of FIG. 5 represents the light measuring outputs across terminals 1, 2 and 1, 3 of the light measuring circuit, with its maximum value taken as a reference value, while the abscissa of the graph represents the progress of time starting with initiation of the stopping down operation.

For further calculations, the assumption is made that the pre-determined voltage level V1 is the optimum voltage in the characteristic curve $(f)$. It is also assumed that the stopping down operation is commenced at the time to and then the light measuring output reaches its maximum value at the time $t2$, whereupon a signal is generated for actuating the locking of the diaphragm so as to stop its stopping-down operation. Subsequently, at the time $\epsilon$ after $t2$, the locking is actually effected, at time $t3$. Thus, there is obtained a light measuring output V3, which causes the diaphragm to be stopped down to an excessive extent, failing to provide an optimum diaphragm aperture size. If curve $(f)$ is shifted a distance $\epsilon$ in parallel to the abscissa so as to obtain the curve $(g)$, and curve $(g)$ is compared with the predetermined optimum level, then there may be generated at the time $t1$ a signal for locking the diaphragm, while the actual locking is effected at the time $t2$ so as to obtain an optimum diaphragm aperture.

It is assumed now that curve $(f)$ approximates a parabola represented by the following equation.

$$V1 = kt^2 \ldots \quad (1)$$

where $k$ is constant.

Curve $(g)$, which is obtained by shifting curve $(f)$ to the left by a distance $\epsilon$, will then be given as follows:

$$V1 = k(t + \epsilon)^2 = kt^2 + 2\epsilon kt + k\epsilon^2 \ldots \quad (2)$$

Considering an equation, $V3 = V1 + \epsilon V1'$, since $$V1' = \frac{dV1}{dt}$$

and thus $V1' = 2kt$, $$V3 = kt^2 + 2 \epsilon kt \ldots \quad (3)$$

Equation (2) is obtained by shifting equation (3) in the axial direction by a distance $k\epsilon^2$, while curve $(h)$ corresponds to equation (3).

If the output such as shown by curve $(h)$ is obtained by means of one method or another, a predetermined optimum level may be set to V2 which gives a difference $k\epsilon^2$, as compared with V1, and then the output represented by curve $(h)$ is compared with V2, in response to which a signal for interrupting the stopping down operation is issued at the time $t1$. In this manner, the actual stopping down operation is accomplished at the time $t2$ which is delayed by the time $\epsilon$ as compared with the time $t1$, so that there may be obtained the same result as would have been obtained if the operation was controlled according to curve $(g)$.

The principle of the diaphgram aperture control device according to the present invention has been described thus far. Now, a description will be presented of exemplary circuits embodying this principle.

Figure 6:
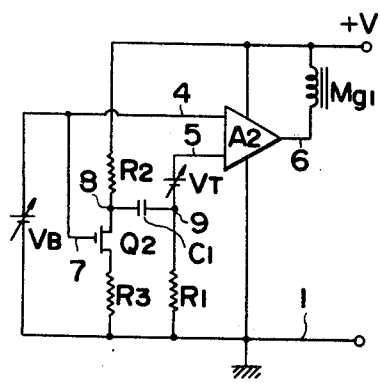
FIG. 6 is a schematic circuit diagram showing the basic principle of the control circuit according to the present invention.

FIG. 6 shows a circuit diagram illustrating the principle of the control device according to the present invention. Shown at VB is a voltage source which represents the light measuring output appearing across terminals 1 and 3 in the light measuring circuit shown in FIG. 4. Shown at VT is a voltage signal source, which provides a signal in response to the shutter time which has been previously set. A circuit A2, which includes a differential amplifying circuit, is a voltage comparing circuit which compares the levels of the voltages impressed on the input terminals 4 and 5 with each other. Electromagnet Mg1 is connected to output terminal 6 of amplifier A2 and the operational mode thereof is reversed so as to lock the diaphragm due to inversion of the output of amplifier A2 which inversion occurs when the voltage level of terminal 4 becomes lower than that of terminal 5.

A circuit consisting of a field effect type transistor Q2 and resistors R2 and R3 connected in series, reverses polarity, so that the potential at a junction 8 is reversed with respect to the potential at a gate 7 of transistor Q2. A circuit consisting of a condenser C1 and a resistor R1 constitutes a differentiation circuit. A description of the operation of the circuit of FIG. 6 will now be provided.

Assuming that the output voltage from voltage source VB is constant, no shifting of the potential occurs at resistor R1, so that only the voltage from voltage source VT is applied to input terminal 5 of voltage comparing circuit A2. When the diaphragm is stopped down so as to provide an output variation as shown in curve $(f)$ of FIG. 5, thereby lowering the potential at gate 7 of transistor Q2, however, then the potential at junction 3 will be raised. Such a variation is transmitted by way of condensor C1 to resistor R1, so that there appears at the opposite ends of resistor R1 a voltage proportional to the differentiated value, in terms of time, of the potential variation at gate 7. Meanwhile the potential at a junction 9 is raised to a level higher than that of ground 1. The voltage Uo across both of the terminals of resistor R1 is given as follows:

$$Uo = C1R1 \frac{dVi}{dt} \quad (4)$$

where Ui represents a voltage across terminals 1 and 8.

Since voltage Ui across terminals 1 and 8 may be rendered proportional to voltage VB across terminals 1 and 7, $$Ui = aVB \ldots \quad (5)$$

where $a$ represents a mean constant (a voltage amplifying rate). Accordingly equation (4) becomes as follows:

$$Uo = aC1R1 \frac{dVB}{dt} \quad (6)$$

On the other hand, $2kt$ in the second term of the right-hand side of equation (3) corresponds to $dVB/dt$.

Accordingly, if the constant of $aC1R1$ in the equation (6) is set so as to be equal to the time delay $\epsilon$, then input terminal 5 of voltage comparing circuit A2 provides an output characteristic as given by curve $(h)$.

Comparing the level at input terminal 4 with that at junction 9 or input terminal 5, the level at input terminal 4 is lowered by $\epsilon dVB/dt$, as compared with the steady state condition, thus obtaining curve $(h)$ for curve $(f)$. If a voltage corresponding to V2 of FIG. 5 is set by using voltage source VT, then the intended operation will be achieved.

Figure 7:
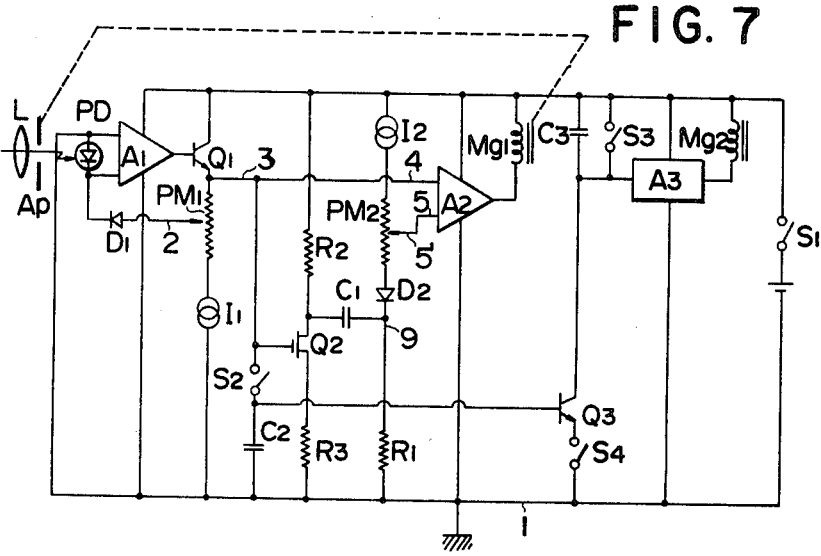
FIG. 7 is a schematic diagram showing a first example of the overall control circuit arrangement of the embodiment of FIG. 1.

FIG. 7 shows a circuit diagram illustrating a first embodiment of the present invention, which follows the above-described principle. Those elements which correspond to the elements in the circuits of FIGS. 4 and 6 are designated by the same reference numerals. The circuit shown in FIG. 7 is a control circuit for use in a single lens reflex camera of the TTL light measuring type. Appearing across terminals 1 and 2 is a voltage which is proportional to the logarithm of the brightness of an objective image, which has passed through objective lens L and diaphragm aperture Ap and has been incident on photo-diode PD.

Sliding element 2 of potentiometer PM1 is moved according to the set film sensitivity, so that the information corresponding to the brightness, the diaphragm aperture size and the film sensitivity is photographically calculated, so that an output is fed from terminals 1 and 3 which is an indication of an optimum exposure time. This output corresponds to the voltage of voltage source VB of FIG. 6. A circuit consisting of transistor Q2, resistors R1, R2, R3, and condensor C1 functions in a manner similar to that circuit shown in FIG. 6.

Shown at I2 is a constant current circuit, through which a constant current flows into potentiometer PM2. Potentiometer PM2 has a linear variation. Sliding element 5' of potentiometer PM2 is moved commensurate with the shutter speed, which has been manually selected, so that the level of the voltage appearing at input terminal 5 of differential amplifying circuit A2 is appropriately adjusted. Thus, if the selected value of the shutter speed is varied by one stage, then the level of the voltage at terminal 5 is varied by a given voltage. Diode D2 compensates for any temperature variation of dioe D1. A series circuit consisting of constant current circuit I2, potentiometer PM2, and diode D2 corresponds to voltage source VT of FIG. 6.

Meanwhile, the time constant of the resistors and condensor of the differentiating circuit should be relatively small compared to the varying signals for the time constant circuit. For this reason, the resistance of resistor R1 is set to a relatively small value as compared with the resistance of potentiometer PM2. Accordingly, the voltage across both ends of resistor R1 in the steady state condition is sufficiently low so as not to exert any influence on the circuit design of the other elements.

Condensor C2 is a so-called storage condensor, which stores a signal indicative of the brightness of an object and the diaphragm aperture size when switch S2 is brought into its open position after the determination of a diaphragm aperture size but prior to the rotation of a mirror. Thus, condensor C2 charges and stores the light measuring output voltage from across terminals 1 and 3. Transistor Q2 is a so-called anti-logarithmically converting transistor, which provides a current proportional to the anti-logarithm of a voltage impressed between the base and the emitter at a collector. Condenser C3 is an integrating condenser which integrates a collector current in transistor Q3.

When the level of the charging voltage of integrating condensor C3 reaches a given level, then switching circuit A3 effects switching so as to interrupt the current for electromagnet Mg2, thereby causing the shutter to be closed. Meanwhile, switch S3 which is maintained open while the shutter is in its exposure position, is subsequently closed and discharges the electrical charges in integrating condensor C3. A switch S4 is a trigger switch which is closed simultaneously with the commencement of exposure and opened upon completion of exposure. It should be noted here that a manual shutter speed setting only changes the voltage at terminal 5' of potentiometer PM2 for determining the diaphragm aperture but that the actual shutter speed will be controlled in accordance with the collector current of transistor Q3 which is indicative of the intensity of the light from an object which has passed through the determined diaphragm aperture.

In operation, when the exposure time is selected by means of a shutter speed selecting member such as a shutter speed dial, the level of one of the input terminals of voltage comparing circuit A2 is varied in correspondence with the selected speed. Referring to FIG. 5, assuming that voltage V1 is eventually imparted to the gate of transistor Q2, then voltage V2 will be imparted to terminal 5.

As diaphragm aperture Ap is being stopped down from the fully opened diaphragm aperture to the minimum aperture in association with a shutter releasing operation, then the potential at terminal 3 is lowered with a time lapse, as shown by curve $(f)$ of FIG. 5, so that, as previously described, the potential at junction 9 is raised by a level corresponding to a voltage proportional to the differentiated value $dVB/dt$, as compared with the voltage in the steady state condition. Stated otherwise, when viewing the input terminal 4 from the side of input terminal 5, the potential is lowered by the above-noted level, so that the same result is obtained as may be obtained in a case where a signal corresponding to curve ($h$) would be imparted to terminal 4.

As a result, voltage comparing circuit A2 is reversed at the time $t1$, so that there is issued a signal for locking a diaphragm to stop its stopping down operation. Actually, however, the stopping down operation is ceased at the time $t2$ which is delayed by the time $\epsilon$.

A voltage corresponding to light measuring output voltage V1 obtained at the diaphragm aperture at the time $t2$ upon the light measurement is stored in condenser C2. As apparent from the above discussion, in spite of the time delay in the locking operation as the diaphragm is being stopped down, there is still achieved a high degree of accuracy in the diaphragm aperture control. In this manner, the diaphragm aperture is determined, and the information indicative of the light from an objective image which has passed through the diaphragm aperture is stored in condensor C2, so that an actual exposure time is controlled based on the values thus stored.

Consequently, even if the determination of the diaphragm aperture size is not accomplished in an ideal manner, as has been previously described, little error will be incurred in the overall exposure control. In addition, as also previously described, the shutter speed to be controlled may be brought into coincidence with a shutter speed which has been selected beforehand, since the diaphragm aperture control may be carried out in an ideal manner. Furthermore, even in the situation where there is not obtained a diaphragm aperture which provides an optimum exposure, with respect to the brightness of an objective image and the selected shutter speed, an optimum exposure control can still be achieved at a fully opened diaphragm aperture or at the minimum diaphragm aperture. For example, if an object to be photographed is so dark that proper diaphragm aperture is not obtained with the shutter speed manually set to one two-hundred and fiftieth second the diaphragm will be held at a fully open diaphragm aperture and the actual shutter speed will be longer than one two-hundred and fiftieth second. On the other hand, if the object is so bright that a proper diaphragm aperture is not obtained with the shutter speed manually set to one two-hundred and fiftieth second, the diaphragm will be stopped down to a minimum diaphragm aperture and the actual shutter speed will be shorter than one two-hundred and fiftieth second.

Figure 8:
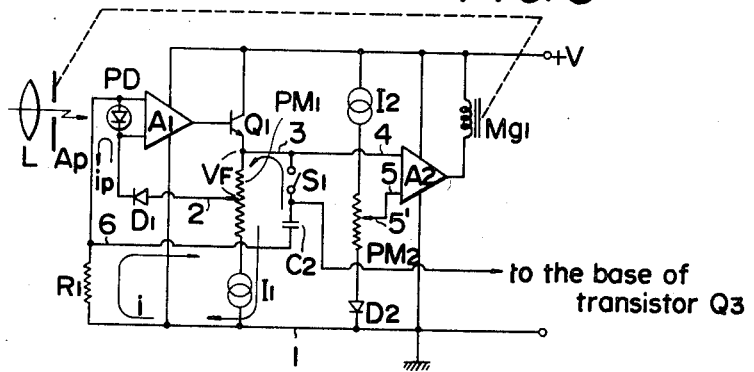
FIG. 8 is a schematic circuit diagram showing a second example of the overall control circuit arrangement according to the present invention, with the shutter speed control circuit being omitted.

FIG. 8 shows a second embodiment of the present invention, in which the shutter speed control circuit downstream of transistor Q3 is omitted. With this control circuit, a differentiating circuit consists of storage condensor C2 and resistor R1 connected between the input of amplifying circuit A1 in the light measuring circuit and grounding level 1.

In the operation of the circuit shown in FIG. 8, when a diaphragm is stopped down and accordingly the intensity of the illumination on the light receiving surface of the photo-diode is reduced, the voltage level of terminal 3 is lowered. Then, the electrical charges which have been charged in condensor C2 is discharged by way of switch S1, which is maintained in its closed position. In this respect, a discharging path will exist as shown by the arrow in the drawing. Assuming that there is a discharging current $i$ at this time, which current varies with time, then a voltage drop of R1$i$ results in resistor R1 having a resistance R1, while the voltage level at terminal 6 is lowered by R1$i$, as compared with the voltage at grounding terminal 1. Almost zero voltage is applied across both of the ends of photo-diode PD, while a voltage VP proportional to the logarithm of the brightness of the light on the light receiving surface of photo-diode PD appears across both of the ends of diode D1, so that the voltage across terminals 3 and 6 will be voltage VT having a voltage VP plus a voltage Vf corresponding to the film sensitivity, i.e., $VT = VP + Vf$. As a result, the voltage VT' across terminals 1 and 3 is lowered by a level of R1$i$ as compared with VT, and a signal corresponding to curve ($h$) in FIG. 5 is obtained. When the diaphragm aperture size is determined, then the discharging is ceased, and the discharging current flowing through resistor R1 is nulified, so that there appears almost zero voltage across both of the ends of resistor R1, while voltage VT appears across terminals 1 and 3, and those voltages are stored in storage condensor C2.

Figure 9:
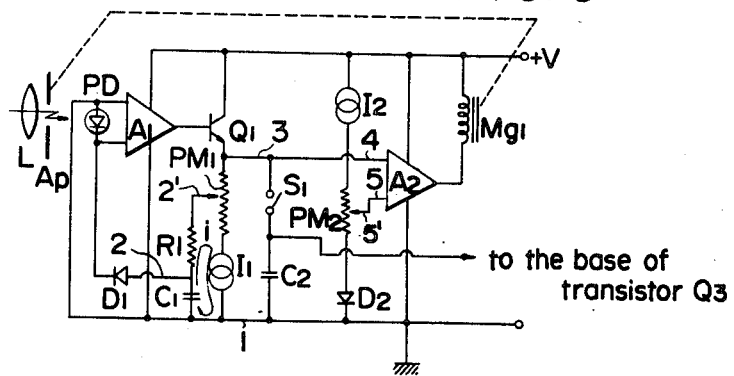
FIG. 9 is a schematic circuit diagram showing a third example of the overall control circuit arrangement according to the present invention, with the shutter speed control circuit again being omitted.

FIG. 9 illustrates a circuit diagram of a third embodiment of the present invention. With this circuit, resistor R1 and condensor C1 are connected as shown so as to constitute the differentiating circuit. As the stopping down operation of the diaphragm progresses, the voltage level at terminals 3 and 2' is correspondingly lowered, so that the electric charges in condensor C1 are discharged by way of resistor R1, as shown by the arrow in the drawing. This discharging current $i$ causes a voltage drop of R1$i$ in resistor R1. Consequently, at the time of discharge, the voltage level at terminal 2' and 3 will be lowered by an extent of R1$i$, as compared with the voltage in the steady state condition, while a signal corresponding to curve ($h$) in FIG. 5 is obtained across terminals 1 and 3. When the diaphragm aperture size is determined, then the discharge is ceased, and the potential difference is nulified between both of the ends of resistor R1.

A further decription of the operation of the circuits of FIGS. 8 and 9 is presented below. Assume that the capacitance of differentiating condensor C2 (FIG. 8) or C1 (FIG. 9) is C in the case where the diaphragm is in its open condition, and the charging voltage is VTO. Further assume that the charging voltage varies in the course of the stopping down operation in the same manner as does the charging voltage, $VTO - at^2$, of the differentiating condensor, where a is a positive constant. Still further assume an electrical charge of Q to be discharged for a period of time $t$, then the variation in voltage will be $at^2$, so that $at^2 \times C = Q$. In addition, since $Q = \int i dt$, then $\int i dt = aCt^2$. By differentiating both sides of the equation, there is obtained $i = 2dCt$. Accordingly, the voltage drop at resistor R1 is given as follows:

$$R1i = R1C \times 2at.$$

This reveals that the voltage drop in the resistor R1 is proportional to the differentiated value of the light measuring output.

It is noted that the above description and the accompanying drawings are provided merely to present exemplary embodiments of the present invention and that additional modifications of such embodiments are possible within the scope of this invention without deviating from the spirit thereof.

We claim:

1. An automatic diaphragm aperture control device for use in a camera having an objective lens, a diaphragm having a diaphragm aperture, a shutter mechanism and a shutter speed selecting member, the automatic diaphragm aperture control device comprising:

means for stopping down a diaphragm from its open position, prior to the commencement of exposure, in association with a shutter releasing operation;

light measuring means for measuring the light passing through the objective lens and the diaphragm aperture and producing an output signal indicative of such measurement;

output means providing an output signal commensurate with a shutter speed selected by the shutter speed selecting member;

locking means for determining a diaphragm aperture by locking said means for stopping down the diaphragm so as to stop its stopping down operation;

output control means for producing a control signal for actuating the operation of said locking means;

differentiating means for producing an output signal commensurate with a variation in the output signal of said light measuring means, in terms of time, the variation in this light measuring output signal corresponding with the extent that the diaphragm has been stopped down; and means for feeding to said output control means the output signal of said differentiating means plus the difference between the output signal of said light measuring means and the output signal of said output means.

2. A device as defined in claim 1, wherein the output signal of said differentiating means compensates for an error in the diaphragm aperture being stopped down from the time when said locking means is actuated in response to the control signal of said output control means until said locking means actually locks the diaphragm.

3. A device as defined in claim 1, wherein said output control means has two input terminals and compares input signals received at both of said input terminals, one of said input terminals being connected to receive the output signal of said output means, and the other of said terminals being connected to receive sum of the output signal of said light measuring means and the output signal of said differentiating means.

4. A device as defined in claim 1, wherein said output control means has two input terminals and compares input signals received at both of said input terminals, one of said input terminals being connected to receive the output signal of said light measuring means, and the other of said input terminals receiving sum of the output signal of said output means and the output signal of said differentiating means.

* * * * *